US012700154B2

(12) United States Patent
Tendolkar et al.

(10) Patent No.: US 12,700,154 B2
(45) Date of Patent: Aug. 4, 2026

(54) PHOTOSPREAD ENGINE(S) FOR COLLAGE GENERATION

(71) Applicant: Microsoft Technology Licensing, LLC, Redmond, WA (US)

(72) Inventors: Gaurav Vinayak Tendolkar, San Jose, CA (US); Aryan Singh, Noida (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 250 days.

(21) Appl. No.: 18/680,239

(22) Filed: May 31, 2024

(65) Prior Publication Data

US 2025/0371763 A1     Dec. 4, 2025

(51) Int. Cl.
| | |
|---|---|
| *G06T 11/60* | (2026.01) |
| *G06T 3/40* | (2006.01) |
| *G06T 3/60* | (2006.01) |
| *G06T 7/62* | (2017.01) |
| *G06T 7/73* | (2017.01) |

(52) U.S. Cl.
CPC ............... *G06T 11/60* (2013.01); *G06T 3/40* (2013.01); *G06T 3/60* (2013.01); *G06T 7/62* (2017.01); *G06T 7/73* (2017.01)

(58) Field of Classification Search
CPC ....................................................... G06T 11/60
USPC ......................................................... 715/243
See application file for complete search history.

(56) References Cited

U.S. PATENT DOCUMENTS

| | | | | |
|---|---|---|---|---|
| 7,409,635 | B2 * | 8/2008 | Epstein | ................. G06F 40/114 |
| | | | | 715/243 |
| 7,478,323 | B2 * | 1/2009 | Dowdy | .................... G06F 16/50 |
| | | | | 715/275 |
| 7,689,909 | B1 * | 3/2010 | Szuszczewicz | .... H04N 1/00188 |
| | | | | 715/204 |
| 7,743,322 | B2 * | 6/2010 | Atkins | .................... G06F 30/18 |
| | | | | 715/253 |

(Continued)

FOREIGN PATENT DOCUMENTS

| | | |
|---|---|---|
| CN | 114511444 A | 5/2022 |
| CN | 115631360 A | 1/2023 |
| JP | 6268891 B2 | 1/2018 |

OTHER PUBLICATIONS

International Search Report and Written Opinion received for PCT Application No. PCT/US2025/017103, mailed on May 15, 2025, 16 pages.

(Continued)

*Primary Examiner* — Reza Nabi

(57) ABSTRACT

Systems and methods herein provide a photospread engine and its related functions. In an example, a method includes identifying, by a photospread engine, images for a photospread and determining image areas based on the plurality of images. Each of the image areas may correspond to a respective image. The photospread engine may also determine a center point for each image area and then minimize a loss function for the image areas. The loss function may correspond to an overlap loss for an overlap area between the image areas and a spreading loss for a distance sum between the center point of each image area and a centroid of the image areas. The photospread engine may generate a photospread including the images on a canvas based on optimizing the loss function for the image areas.

20 Claims, 14 Drawing Sheets

(56)                References Cited

U.S. PATENT DOCUMENTS

| | | | | |
|---|---|---|---|---|
| 8,024,658 | B1 * | 9/2011 | Fagans | H04N 1/00196 |
| | | | | 715/730 |
| 8,806,331 | B2 * | 8/2014 | Grosz | G06F 16/51 |
| | | | | 715/251 |
| 8,947,451 | B2 * | 2/2015 | Mondry | G06T 11/60 |
| | | | | 345/620 |
| 8,976,198 | B2 * | 3/2015 | Borders | G06T 11/60 |
| | | | | 715/788 |
| 2004/0205498 | A1 * | 10/2004 | Miller | G06F 40/106 |
| | | | | 715/202 |
| 2008/0301546 | A1 * | 12/2008 | Moore | G06T 11/60 |
| | | | | 715/243 |
| 2009/0249177 | A1 * | 10/2009 | Yamaji | G06T 11/60 |
| | | | | 715/204 |
| 2019/0139282 | A1 * | 5/2019 | Rathore | G06F 18/22 |
| 2020/0013380 | A1 * | 1/2020 | Kakoyiannis | G06F 16/61 |
| 2022/0208155 | A1 * | 6/2022 | Ivers | G10H 1/368 |
| 2023/0260175 | A1 * | 8/2023 | Epstein | G06T 11/60 |
| | | | | 345/619 |
| 2024/0087547 | A1 * | 3/2024 | Ivers | G10H 1/0008 |
| 2025/0104305 | A1 * | 3/2025 | Tagra | G06T 11/60 |
| 2025/0265751 | A1 * | 8/2025 | Singh | G06T 11/60 |
| 2025/0285347 | A1 * | 9/2025 | Zhang | G06T 11/60 |
| 2025/0371763 | A1 * | 12/2025 | Tendolkar | G06T 11/60 |

OTHER PUBLICATIONS

Kang, et al., "Photo Collage-Based Photograph Display System on Mobile Computing Platform", The Journal of Supercomputing, vol. 74, No. 8, May 24, 2017, pp. 3841-3854.
Sadeghi, et al., "Learning to Select and Order Vacation Photographs", 2015 IEEE Winter Conference on Applications of Computer Vision, Jan. 5, 2015, pp. 510-517.

* cited by examiner

450B

450D

450A

450C

662

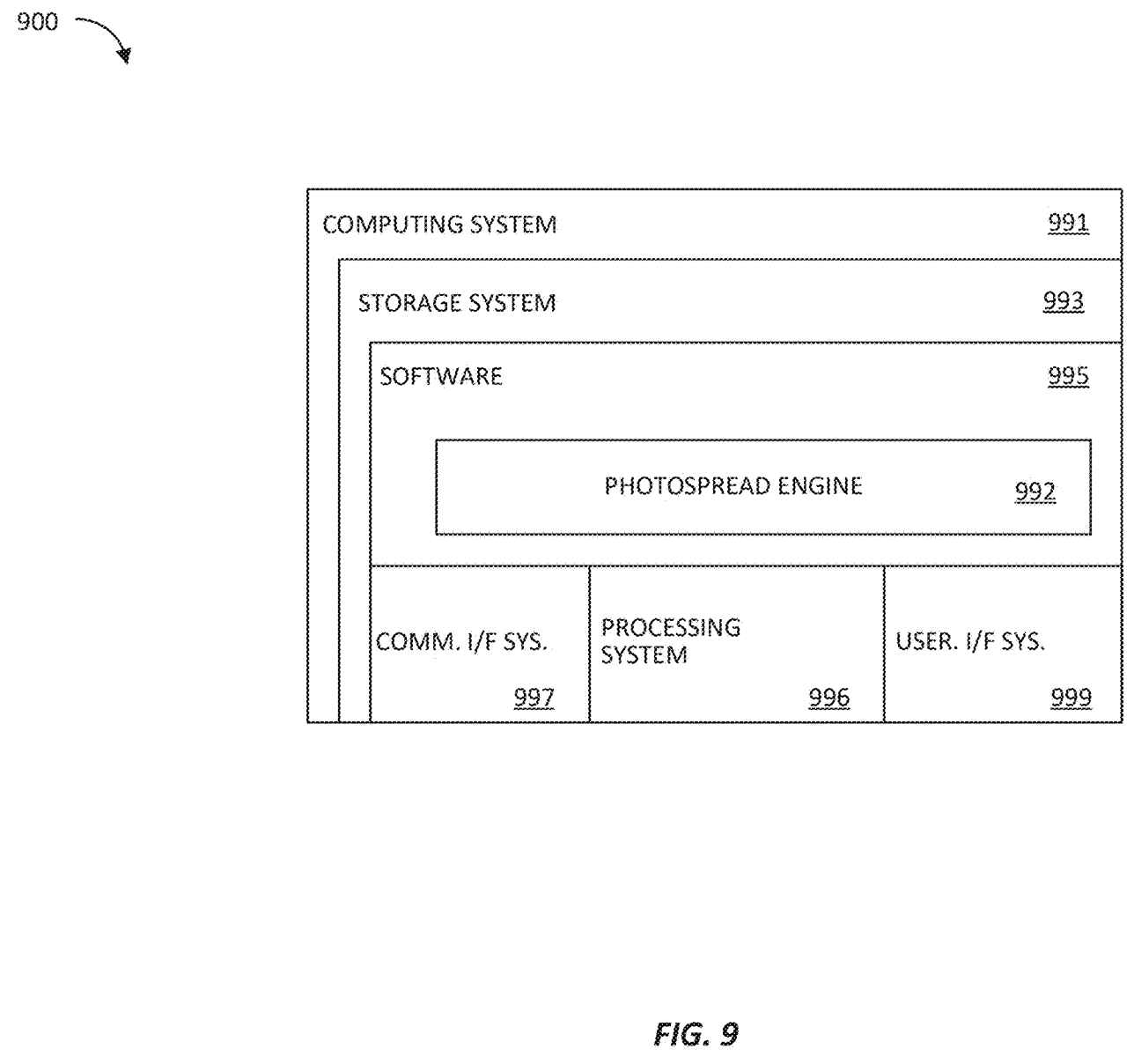

900

COMPUTING SYSTEM 991

STORAGE SYSTEM 993

SOFTWARE 995

PHOTOSPREAD ENGINE 992

COMM. I/F SYS. 997

PROCESSING SYSTEM 996

USER. I/F SYS. 999

FIG. 9

PHOTOSPREAD ENGINE(S) FOR COLLAGE GENERATION

TECHNICAL FIELD

Aspects of the disclosure are related to the field of computer software applications and services and, in particular, to photospread engines for generating collage and/or collage layouts.

BACKGROUND

Image collages have become a versatile tool in modern society, seamlessly integrating into both professional and personal spheres to convey information and capture memories. In the professional realm, businesses and marketers leverage image collages to create visually compelling presentations, advertisements, and social media content that succinctly convey a brand's message or showcase a product's features. These collages enhance storytelling by combining multiple images into a cohesive narrative, making complex information more accessible and engaging. On a personal level, individuals use image collages to commemorate special events, celebrate milestones, and share moments on social media platforms. By curating a collection of photographs, people can encapsulate emotions and experiences in a single, impactful visual. Whether used to drive consumer engagement or to preserve personal memories, image collages serve as a powerful medium for communication and expression in the digital age.

Current approaches to generating photo collages often fall short in several key areas, primarily due to the non-organic arrangement of images and the reliance on set templates. These methods typically arrange photos in rigid, pre-determined grids or patterns, which can result in collages that lack uniqueness and fail to capture the dynamic, personalized essence of the images. The uniformity of these templates means that many collages end up looking strikingly similar, diminishing the impact and emotional resonance that a more customized arrangement could provide. Furthermore, the non-organic placement of images can disrupt the natural flow and visual storytelling that a more fluid, intuitive layout might achieve. As a result, these collages often feel static and impersonal, missing the opportunity to create a more engaging and memorable visual experience.

Conventional collage methods also struggle to effectively manage a large number of images, as well as varying image sizes, orientations, and shapes. Traditional templates are often designed for a fixed number of photos, leading to overcrowding or awkward spacing when more images are added. This limitation not only affects the aesthetic appeal but also makes it difficult to highlight individual photos, causing important details to be lost in the clutter. Additionally, standard templates usually accommodate images of uniform size and shape, resulting in a forced and unnatural fit for photos that deviate from these dimensions. This rigidity can distort images, crop out essential elements, or create jarring visual breaks in the collage. As a result, the final product may appear disjointed and fail to effectively convey the intended narrative or emotion, highlighting the need for more flexible and adaptive collage solutions.

Accordingly, there is a need for a photospread engine, and its related functions, for generating organic and unique collages or photospreads for images over a range of shapes, sizes, and orientations. As will be expanded on below, the photospread engine generates photospreads that are more engaging and memorable, thereby improving overall user experience across diverse audiences.

SUMMARY

Technology disclosed herein includes software applications and services that provide a photospread engine, and its related functions. In an aspect, a photospread engine may identify images for a photospread. For example, the photospread engine may receive a request from a client device that includes images for generation of the photospread. Based on the images, the photospread engine may determine an image area for each respective image. The image area may correspond to the dimensions of the image. In some embodiments, the photospread engine may approximate the dimensions of the image by using a bounding box.

Using the image areas, the photospread engine may generate a random arrangement of the image areas in an initial layout. From the initial layout, the photospread engine may determine a loss function of the image areas. The loss function of the image areas may be based on an overlap loss of the image areas and/or a spreading loss of the image areas. In some embodiments, the loss function may also be based on a rotation parameter or allowed rotation for the image areas.

The photospread engine may iteratively generate layouts and determine a corresponding loss function. In some embodiments, the photospread engine may optimize the layout generation based on the loss function of the previously generated layout. As such, the photospread engine may generate layouts that increasingly minimize the loss function of the image areas. The photospread engine may iterate until a layout that minimizes the loss function is determined. In some embodiments, the iteration process is bounded by an iteration threshold that limits the number of iterations or time of iterations to determine a loss function minima.

Once the loss function minima is determined, the corresponding layout may be determined as a final layout. In some embodiments, to generate the final layout, the photospread engine may also center the image areas on a respective canvas. In other embodiments, the photospread engine may generate a background and apply the background on the respective canvas. When the final layout is finalized (e.g., the image areas centered, background applied), the photospread engine may insert corresponding images into the image areas on the final layout to generate the photospread. Once generated, the photospread engine may provide the photospread to the requesting client device.

This Summary is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 9 shows an example client device suitable for providing a photospread engine and related functions, according to an embodiment herein.

DETAILED DESCRIPTION

Figure 1:
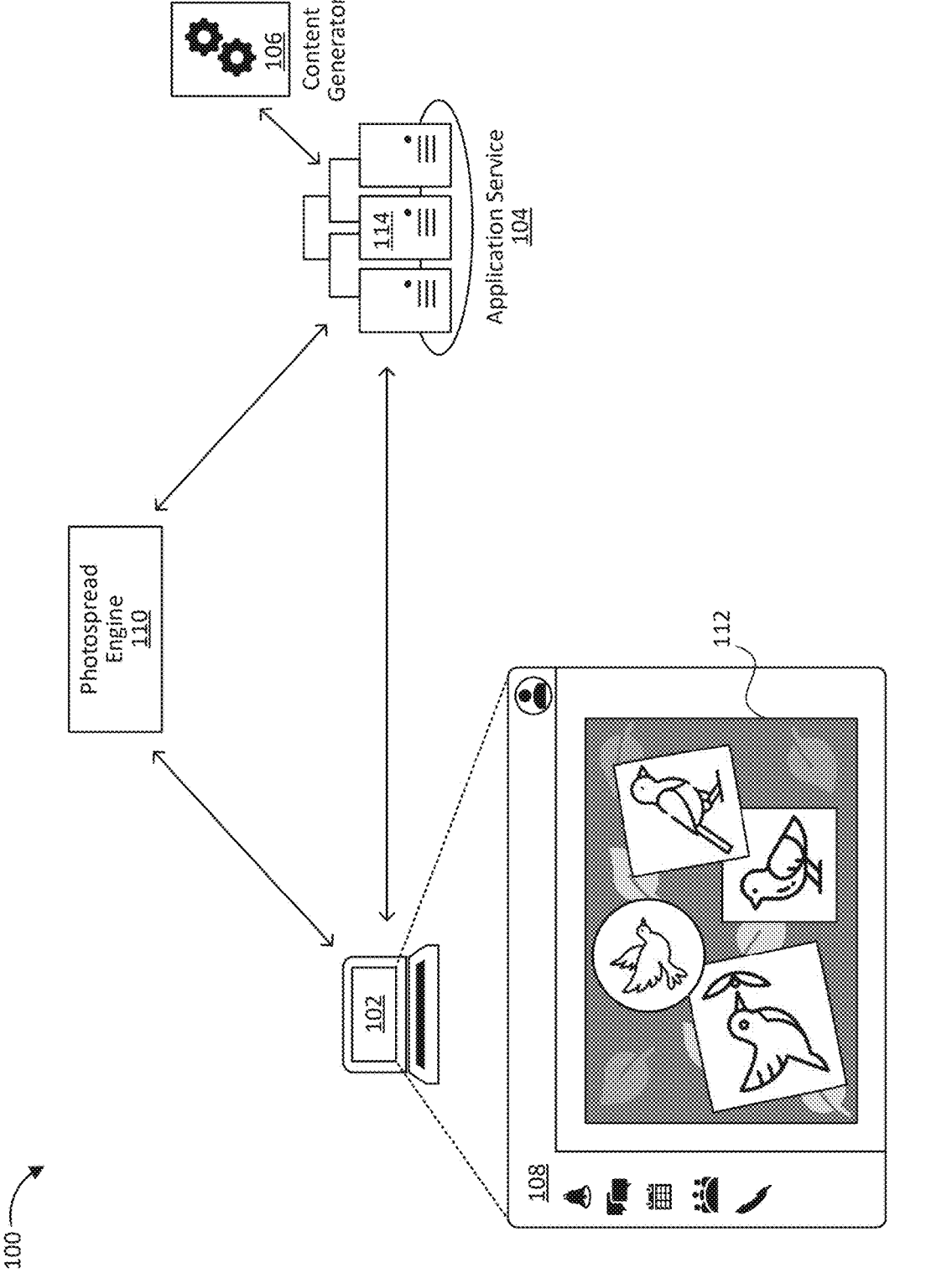
FIG. 1 illustrates an operational environment for providing a photospread engine, according to an embodiment herein.

Photo collages, also referred to herein as photospreads, offer numerous benefits and versatile uses across various contexts. For example, photospreads serve as an excellent tool for visually storytelling, allowing the seamless integration of multiple images into a single, cohesive presentation. This makes photospreads ideal for capturing the essence of events, experiences, or themes in both personal and professional settings. In marketing, businesses use photospreads to create engaging advertisements and social media content that can quickly convey a brand's message and aesthetic. For individuals, photospreads provide a creative way to document and share memories, from family gatherings to travel adventures, in a visually appealing format. Furthermore, photospreads can enhance educational materials by presenting information in a more digestible and attractive manner. Overall, the ability of photospreads to combine and showcase various images in a harmonious and impactful way makes them a valuable tool for communication and expression.

Conventional approaches to collage generation, however, often fall short in several key areas, primarily due to the fixed arrangement of images and reliance on preset templates. These methods typically organize photos in rigid, predetermined grids or patterns, leading to collages that lack uniqueness and fail to capture the dynamic, personalized essence of the images. The uniformity of these templates means that many photospreads end up looking strikingly similar, diminishing their impact and emotional resonance. Moreover, the non-organic placement of images can disrupt the natural flow and visual storytelling that a more fluid, intuitive layout might achieve. Consequently, these collages often feel static and impersonal, missing the opportunity to create a more engaging and memorable visual experience.

Additionally, conventional techniques to collage generation often struggle to accommodate a wide range of image sizes, aspect ratios, shapes, and orientations. Traditional templates are often designed for a fixed number of photos, which can lead to overcrowding or awkward spacing when additional images are added. This limitation not only affects the aesthetic appeal but also makes it difficult to highlight individual photos, causing important details to be lost in the clutter. Additionally, standard templates usually accommodate images of uniform size and shape, resulting in a forced and unnatural fit for photos that deviate from these dimensions. This rigidity can distort images, crop out essential elements, or create jarring visual breaks in the photospread. Consequently, the final product may appear disjointed and fail to effectively convey the intended narrative or emotion, underscoring the need for more flexible and adaptive photospread solutions.

To address at least these shortcomings of conventional collage generation, example photospread engines for generating organic and unique photospreads are provided herein. As will be described in greater detail below, an example photospread engine can generate a unique collage layout from a provided set of images, accommodating any number of images and any size of images. In addition to accommodating a wide range of image numbers and image sizes, the photospread engine can accommodate different image and canvas shapes and orientations, thereby expanding the creative reach of collage generation.

To generate unique and organic photospreads, the photospread engine may determine an arrangement of images that maximizes the aesthetic quality of the photospread. That is, the photospread engine generates unique layouts of the images without excessive overlap, cropping, or distorting of the images. To generate a unique layout, the photospread engine may determine image areas for each of the images. The image areas may correspond to the dimensions of a respective image. In some embodiments, the image areas may be an approximation of an image's dimensions, such as by using a bounding box.

Once the image areas are generated, the photospread engine may generate an initial layout of the image areas. The initial layout may be a starting point from which the photospread engine performs an iteration process to determine an optimal or final layout for the images. During the iteration process, the photospread engine may determine a loss function based on the arrangement of the image areas in the initial layout. As will be expanded on below, the loss function may be based on an overlap loss and a spreading loss of image areas in a given arrangement. The overlap loss may measure or be determined based on a sum of overlap areas between each pair of image areas. And the spreading loss may measure or be determined based on a sum of distances between each image area's center to a centroid of all the image areas.

The photospread engine may iteratively rearrange the image areas until a layout that minimizes the loss function is identified. In some embodiments, the iteration process is bounded by a predetermined iteration threshold, meaning that an optimal or final layout may be determined as the layout that minimizes the loss function of the image areas within a set iteration duration (e.g., iteration time or number of iterations). Once the optimal or final layout is determined, the photospread engine may generate a photospread based on the layout, such as by generating a background for a canvas, overlaying the layout on the canvas, and/or inserting the images into a respective image area within the layout.

By using an iteration process in which image areas may be randomly repositioned until a loss function is determined, a unique photospread may be generated each time. That is, the photospread engine may enhance both the visual appeal and emotional impact of the collage by providing a unique and organic photospread. An organically arranged photospread allows for a more fluid and natural presentation of images, capturing the true essence and individuality of each photo. This personalized approach ensures that every image is highlighted appropriately, preventing important details from being overshadowed or lost. A unique photospread can also tell a more compelling and cohesive story, as the flexible layout adapts to the varying sizes, shapes, and orientations of the photos, creating a harmonious visual narrative. Furthermore, such photospreads are more engaging and memorable, as they stand out from the typical, uniform templates. Accordingly, by generating unique and organic photospreads, the photospread engines provided herein create content that is more aesthetically appealing and evokes stronger emotional responses, leaving a lasting impression on viewers.

Turning now to FIG. 1, FIG. 1 illustrates an operational environment 100 for providing a photospread engine, according to an embodiment herein. In particular, the operational environment 100 illustrates a client device 102 using an application service 104 for generating content. To generate the content, the client device 102 may communicate with the application service 104 via one or more internets and intranets, the Internet, wired and wireless networks, local area networks (LANs), wide area networks (WANs), or any other type of network or combination thereof. Examples of the client device 102 may include personal computers, tablet computers, mobile phones, gaming consoles, wearable devices, Internet of Things (IoT) devices, and any other suitable devices, of which computing apparatus 991 in FIG. 9 is also broadly representative.

In the illustrated example, the application service 104 operates in a cloud-based environment. As such, the application service 104 employs one or more server computers 114 co-located with respect to each other or distributed across one or more data centers to deliver its functionalities and services. Example servers include web servers, application servers, virtual or physical servers, or any combination or variation thereof, of which computing apparatus 991 in FIG. 9 is broadly representative.

Broadly speaking, the application service 104 provides software application services to end points, such as the client device 102. In particular, the application service 104 may provide software application services involving content generation. For example, the application service 104 may be a graphical design tool that aids users in creating visually appealing content for presentations, social media, and marketing materials, such as Microsoft Designer. As part of its content generation, the application service 104 may provide one or more services for generation collages, which are also referred to herein as photospreads. As those skilled in the art readily appreciate, a photospread or collage is a visual composition that combines multiple photographs or images into a single, cohesive layout, often used to tell a story, commemorate events, or create an artistic presentation. As such, the client device 102 may interact with the application service 104 to generate photospreads based on provided content, such as photos, images, illustrations, graphics, icons, diagrams, screenshots, and the like.

To interact with the application service 104, the client device 102 may load and execute software applications locally that interface with services and resources provided by the application service 104. The applications may be natively installed and executed applications, web-based applications that execute in the context of a local browser application, mobile applications, streaming applications, or any other suitable type of application. Example services and resources provided by the application service 104 include front-end servers, application servers, content storage services, authorization and authentication services, and the like.

As illustrated, the application service 104 may include an integration with the photospread engine 110 to generate photospreads based on images provided by the client device 102. In some embodiments, the photospread engine 110 may be executed remotely by the application service 104 or a third party, while in other embodiments the photospread engine 110 may be installed and executed locally on the client device 102. In still other embodiments, one or more functions of the photospread engine 110, as described herein, may be installed and executed locally on the client device 102, while the remaining functions are integrated and executed remotely via the application service 104 or a third party.

As noted above, when the client device 102 submits a content request, the photospread engine 110 may generate a photospread 112 based on the request. For example, the client device 102 may submit a prompt to the application service 104 requesting a collage based on a set of images. Responsive to the request, the application service 104 may interact with the photospread engine 110 to generate a photospread 112 that maximizes the aesthetic effect of the images, such as by generating a photospread 112 that optimizes a loss function for the images. As will be described in greater detail below, the loss function may be a measurement or quantification of the overlap area of the images and a spreading distance of the images. In some embodiments, the photospread engine 110 may modify various parameters to adjust a desired overlap area and/or spreading distance of the images. Based on a selected or determined overlap area and spreading distance, the photospread engine 110 may iteratively rearrange image areas which, as described below, represent the images within the layout, until a minimum loss function is determined. In some embodiments, the determination of the loss function minima may be bounded by an iteration threshold, which may be a time duration during which the iteration process may occur or a number of iterations that may be performed.

Since there is an infinite minima of loss function and the photospread engine may start with a random initial layout, a unique layout may be generated each time. The layout determined to minimize the loss function may be determined as an optimal or final layout from which the photospread 112 may be created. Once generated, the layout may be arranged on a canvas, such as centered on a canvas. In some embodiments, a background for the canvas may be generated. The background may be generated based on the context of the images, such as determined by the photospread engine 110 or from the request received from the client device 102.

In some embodiments, the background may be generated by a content generator 106, such as a generative content generator. In such cases, the application service 104 may include or be in operational communication with one or more content generators 106. In some embodiments, the application service 104 may be a content generating application, thus including the content generator 106. In other embodiments, the content generator 106 may be hosted by a third party or remote from the application service 104. The content generator 106 may be a content generator capable of visual content creation and/or audio synthesis.

As noted above, the content generator 106 may be a generative content generator. In such cases, the content generator 106 may be an artificial intelligence (AI) content generator that generates content using neural networks or deep learning techniques. In an example, the content generator 106 may include visual content generators, such as DALL-E, DeepDream, DeepAI, DeepArt, or StyleGAN, that generate visually compelling images by leveraging deep learning or neural network techniques to generate diverse and realistic visuals. In another example, the content generator 106 may include an audio content generator, such as Jukedeck or Amper Music, which utilize machine learning algorithms to compose and produce original music tracks tailored to specific requirements or preferences. As should be appreciated, the content generator 106 may be multi-modal and as such may be capable of generating multiple content types.

Once the layout is determined, and in some cases, the background, the photospread engine 110 may generate the photospread using the layout. In an example, this may include inserting respective images into corresponding image areas in the layout and applying the layout onto the canvas and/or background. In embodiments where the content generator 106 includes an audio content generator, the background may include audio, such as a soundtrack, that plays when the photospread 112 is viewed.

When the photospread 112 is generated, the photospread engine 110 may transmit or otherwise provide the photospread 112 to the client device 102. For example, as illustrated, the photospread 112 is provided to a user of the client device 102 via a user interface 108 of an application executing on the client device 102. The application may correspond to the application service 104. The user interface 108 may provide the photospread 112 to the user such that the user can interact with the photospread 112.

Figure 2:
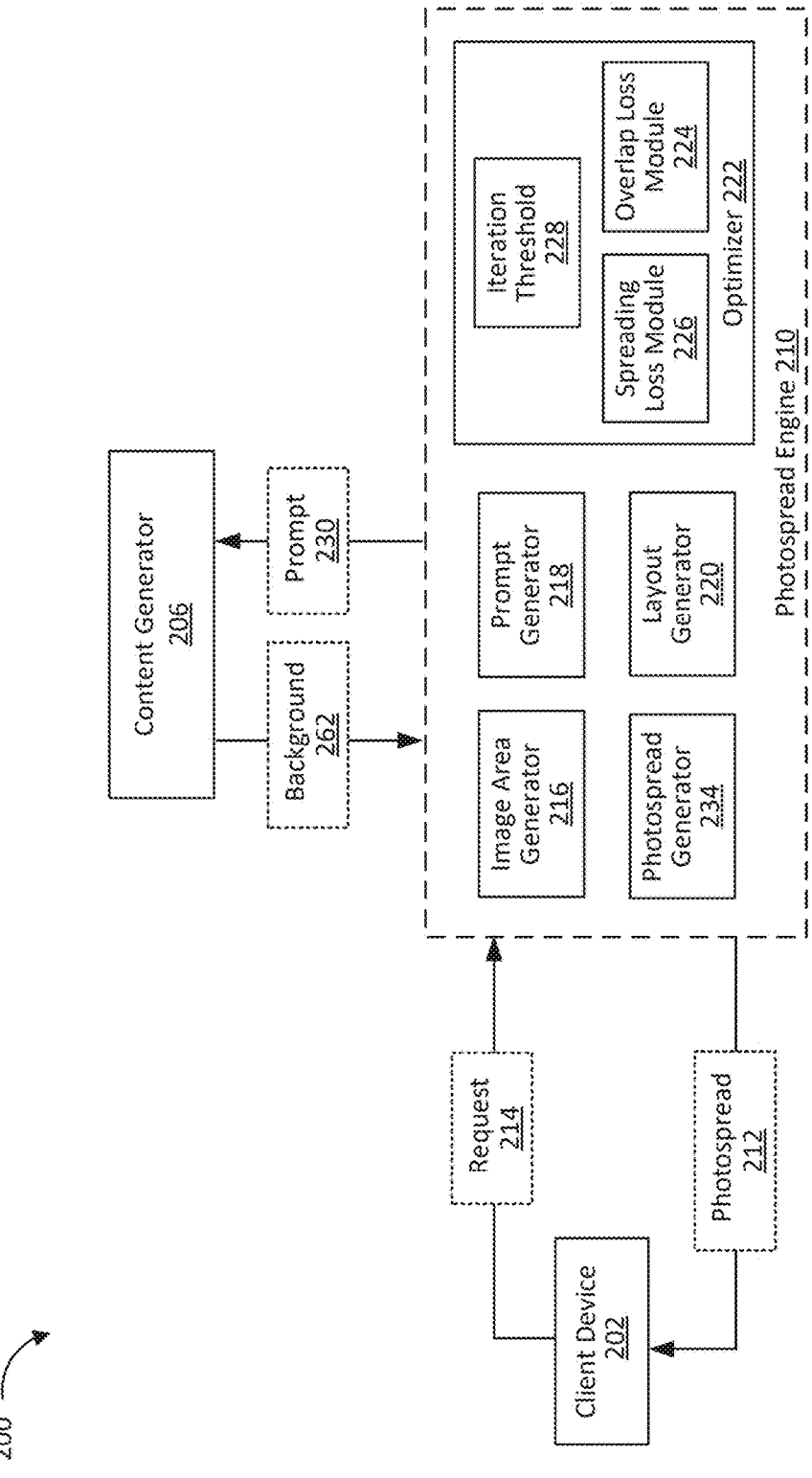
FIG. 2 illustrates an example operational scenario in which a photospread engine is provided, according to an embodiment provided herein.
Figure 3:
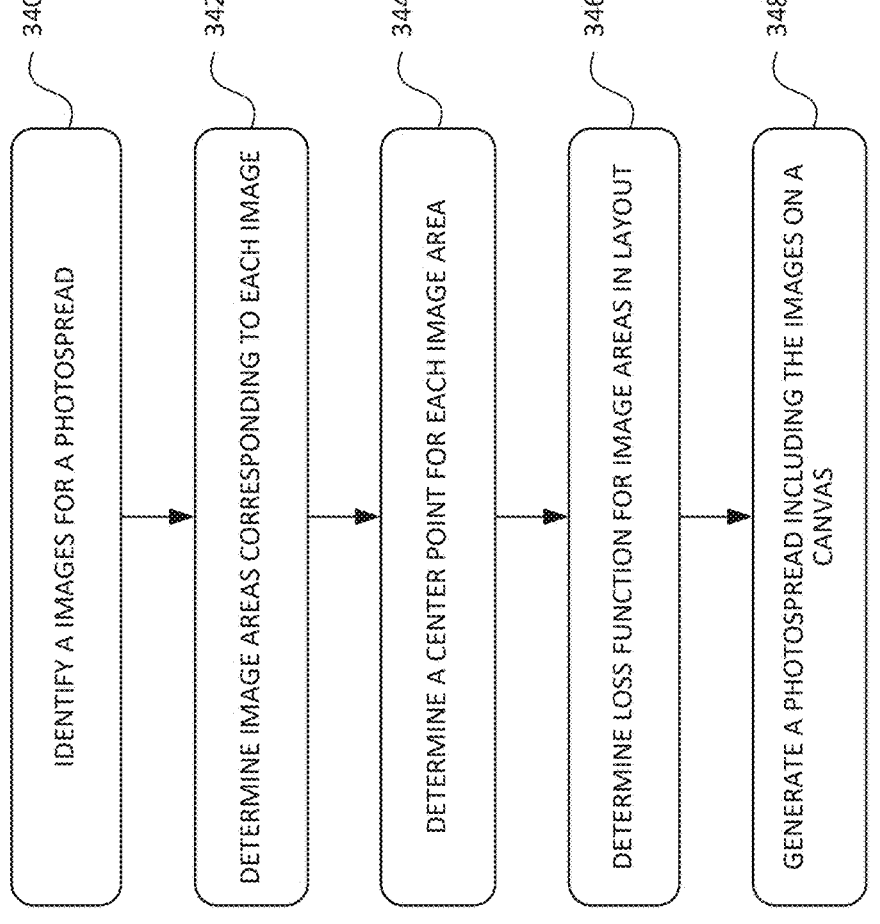
FIG. 3 illustrates a process for providing a photospread engine and its related functions, according to an embodiment herein.

Turning now to FIG. 2, FIG. 2 illustrates an example operational scenario 200 in which a photospread engine 210 is provided, according to an embodiment herein. For ease of illustration, FIG. 2 is described with respect to FIG. 3, which provides a process 300 for providing a photospread engine and its related functions, such as the photospread engine 210, according to an embodiment herein. Although FIG. 3 is described in relation to FIG. 2, it should be appreciated that the process 300 is equally applicable to the remaining Figures and components therein.

As illustrated, a client device 202, which may be the same or similar to the client device 102, may submit a request 214 to the photospread engine 210 to generate a photospread. In embodiments where the photospread engine 210 is part of an application service, such as the application service 104, the request 214 may be transmitted to the photospread engine 210 via the application service 104. As can be appreciated, the request 214 for a photospread may include or otherwise indicate one or more images to be used for the photospread generation. For example, the request 214 may include images as an attachment, may include a link to the images, or otherwise direct the photospread engine 210 as to where the images are stored. It should be appreciated that while the following discussion uses the term "images," other forms of visual content may be used to generate a photospread. Examples of other visual content include photos, illustrations, graphics, icons, diagrams, screenshots, textures, patterns, digital art, clip art, logos, infographics, maps, charts, sketches, paintings, stamps, and the like.

Figure 4:
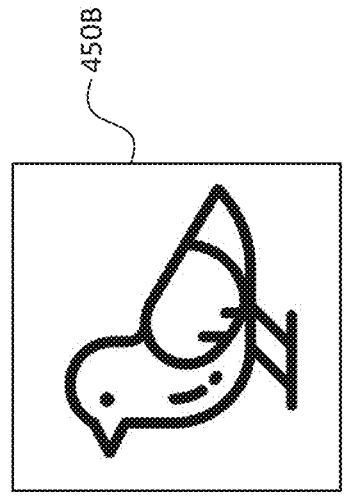
FIG. 4 illustrates example images for generating a photospread, according to an embodiment herein.
Figure 4:
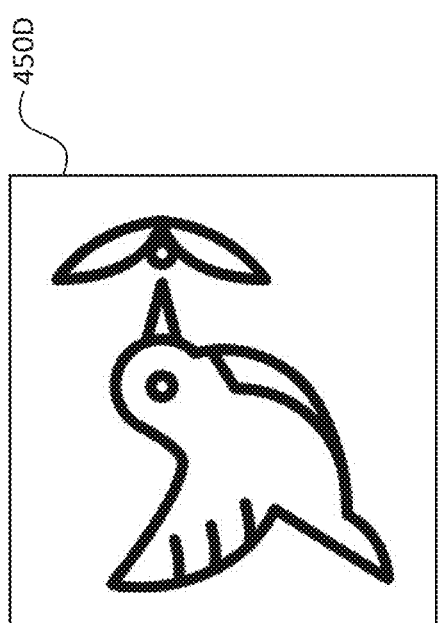
Figure 4:
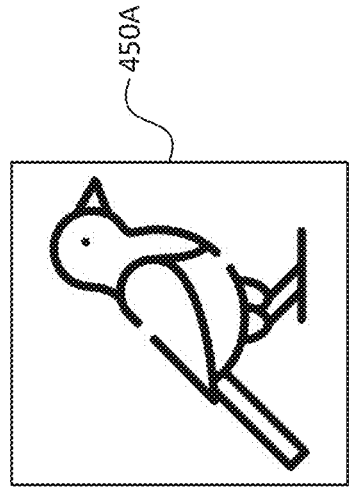
Figure 4:
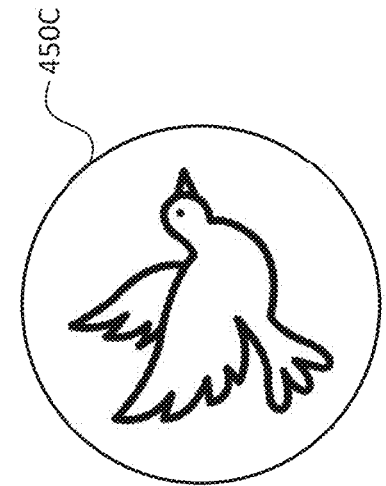

Based on the request 214, the photospread engine 210 may determine or identify the images for the photospread (340). Referring now to FIG. 4, example images for generating a photospread are provided, according to an embodiment herein. As shown by FIG. 4, the photospread engine 210 may identify four images 450A-D for generation of a photospread. That is, the request 214 from the client device 202 may be a request to generate a photospread based on the images 450A-D. As such, the photospread engine 210 may identify the images 450A-D as the images for generating the photospread. It should be appreciated that while the remaining discussion of FIG. 2 is made with reference to FIGS. 4-7, the discussion is equally applicable to other scenarios and embodiments. For example, any number of images may be used to generate a photospread having any orientation, shape, and size.

Figure 5:
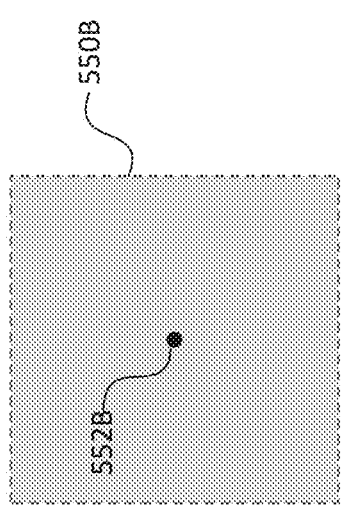
FIG. 5 illustrates example image areas generated based on the images of FIG. 4, according to an embodiment herein.
Figure 5:
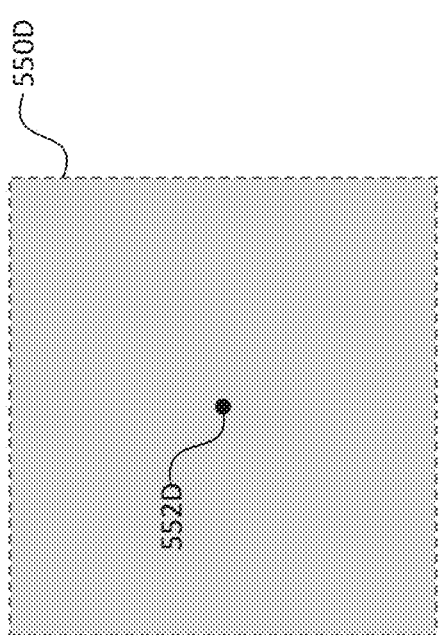
Figure 5:
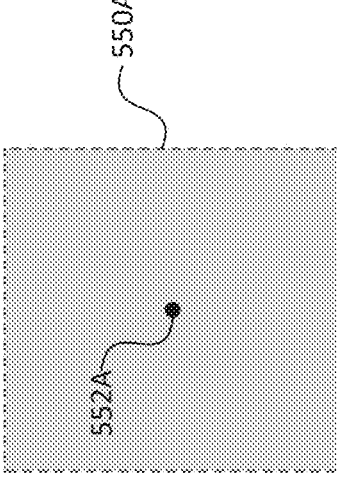
Figure 5:
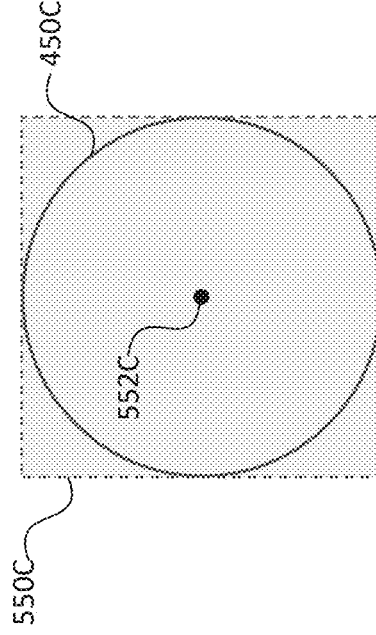

Once the photospread engine 210 identifies the images for the photospread, the photospread engine 210 may determine image areas based on the images (342). In particular, the photospread engine 210 may include an image area generator 216 for determining image areas based on selected images. Following the above example, the image area generator 216 of the photospread engine 210 may determine image areas corresponding to each of the images 450A-D. Referring now to FIG. 5, example image areas 550A-D corresponding to the images 450A-D of FIG. 4 are illustrated, according to an embodiment herein. As shown, an image area 550A may be determined for the image 450A, an image area 550B may be determined for the image 450B, an image area 550C may be determined for the image 450C, and an image area 550D may be determined for the image 450D.

The image areas 550A-D may be based on the dimensions of the respective image 450A-D. For example, in the case of the images 450A, 450B, and 450D having rectilinear shapes (e.g., shapes having straight edges and right angles), the dimensions may be based on the height and width of the respective image. In embodiments, where the image has a non-rectilinear shape, the dimensions of the respective image may be approximated using a bounding box. As those skilled in the art readily appreciate, a bounding box is a rectangular frame used to enclose a non-rectilinear shape, providing a simple way to approximate its dimensions.

As illustrated, the image 450C has a non-rectilinear shape (e.g., circle). As such, the photospread engine 210 may approximate the dimensions of the image 450C using a bounding box. Based on the bounding box, the image area 550C may be determined for the image 450C. In embodiments, a bounding box approximate may be used for all of the images 450A-D and since the images 450A, 450B, and 450D are rectilinear shapes, the approximation from the bounding box may be equal to the height and width of the respective image.

Once the image areas 550A-D are determined, the photospread engine 210 may determine a center point 552A-D for each of the image areas 550A-D (346). In some embodiments, the image area generator 216 may determine the center points 552A-D for each of the image areas 550A-D. The center points 552A-D may be a geometric center of the respective image area 550A-D and as such may be the average position of all the points within the respective image area 550A-D. The center points 552A-D may be determined by calculating the mean of the coordinates of all the vertices within the respective image area 550A-D. For example, the center points 552A-D may be determined by averaging the x-coordinates and y-coordinates of all the vertices of the respective image areas 550A-D.

Figure 6A:
FIGS. 6A-F illustrate example stages of the photospread process.
Figure 6B:
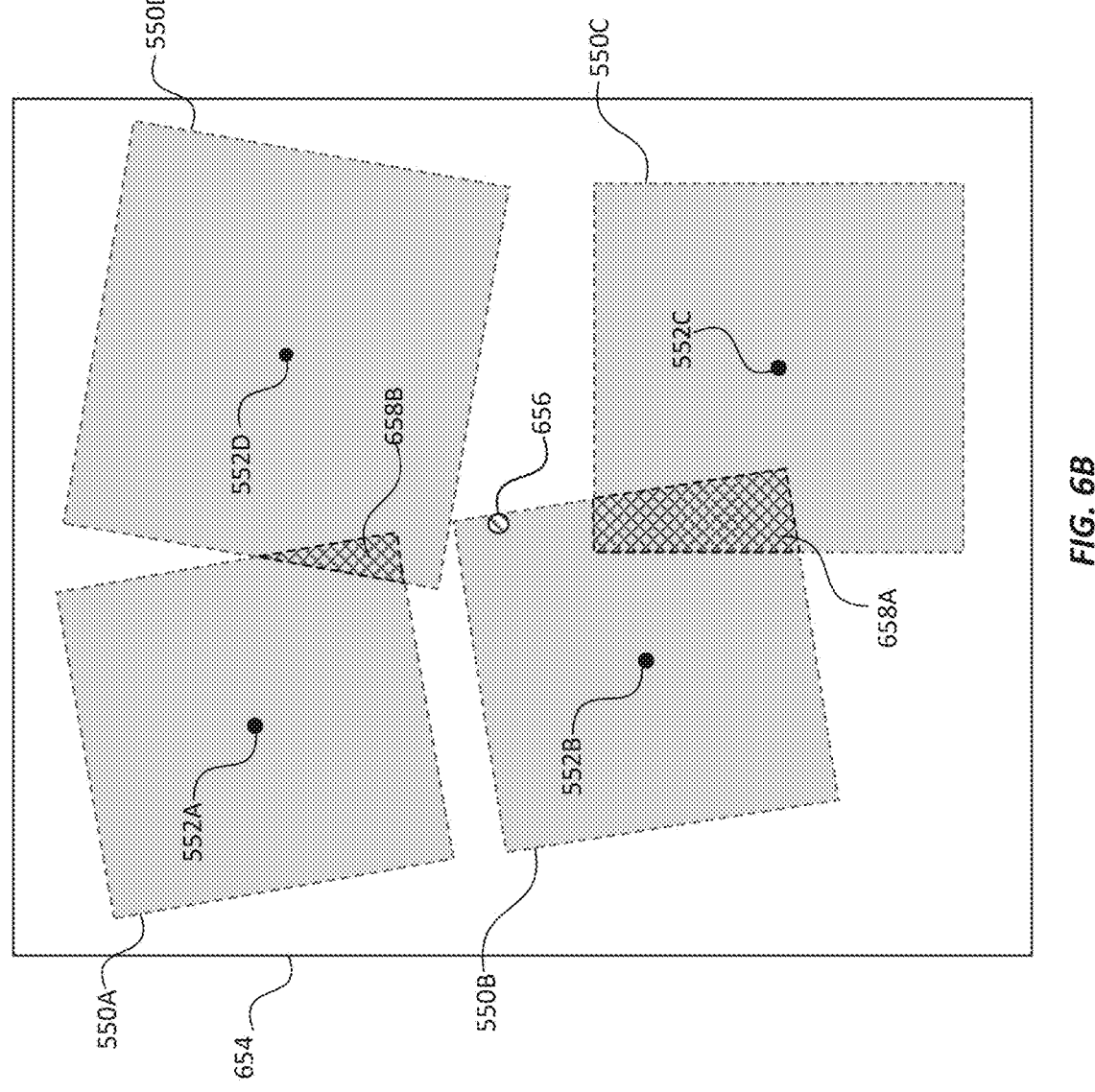

Once the image areas 550A-D are generated or determined, the photospread engine 210 may generate an initial layout. Referring now to FIG. 6A, an example layout 600A including the image areas 550A-D are illustrated, according to an embodiment herein. As shown the layout 600A may include a canvas 654 onto which the image areas 550A-D are arranged. To generate the layout 600A, the photospread engine 210 may include a layout generator 220. The layout generator 220 may include a randomization component which generates random arrangements of the image areas 550A-D on the canvas 654.

In some embodiments, the arrangements of the image areas 550A-D generated by the layout generator 220 may be constrained by one or more parameters. The one or more parameters constraining the arrangement of image areas 550A-D may include an overlap parameter, a spreading parameter, and/or a rotation parameter. Each of these will be described in detail below. Based on these parameters, the layout generator 220 may randomly generate layouts, such as the layout 660A. In some embodiments, these parameters may be predefined by a user, such as the user of the client device 202 or by a developer/organizer of the corresponding application service.

In some embodiments, prior to generating a layout, the photospread engine 210 may modify the image areas 550A-D based on the canvas 654 and/or the other image areas 550A-D. For example, the photospread engine 210 may modify one or more of the image areas 550A-D based on the canvas 654, such as scaling the image areas 550A-D based on the shape or size of the canvas 654. In such cases, the photospread engine 210 may determine the dimensions of the canvas 654 and scale the dimensions (e.g., height and width) of each of the image areas 550A-D based on the dimensions of the canvas 654. In another example, the photospread engine 210 may modify one or more of the image areas 550A-D based on the size of the other image areas 550A-D, such as scaling the image areas 550A-D to be similarly sized. Importantly, the photospread engine 210 may modify the image areas 550A-D without impacting the aspect ratios of each respective image 450A-D. That is, the photospread engine 210 preserves the aspect ratios of the underlying images 450A-D when modifying the image areas 550A-D. As can be appreciated, this may reduce the risk of distorting the images 450A-D during the photospread generation process.

Once an initial layout, such as the layout 600A is generated, the photospread engine 210 may determine a loss function of the image areas 550A-D (348). That is, the photospread engine 210 may determine the loss function of the image areas 550A-D as arranged in the layout 600A. In some embodiments, the photospread engine 210 may include an optimizer 222 that determines the loss function for the image areas 550A-D in a given layout. As noted above, the photospread generation process may be an iterative process, and as such the layout generator 220 may generate a random arrangement of the image areas 550A-D in a new layout at each iteration. And for each new layout, the optimizer 222 may determine the loss function for the image areas 550A-D in that layout. As will be described in greater detail below, the optimizer 222 may iterate through this process until a layout is generated that optimizes the arrangement of the image areas 550A-D within the canvas 654. As used herein, an optimal arrangement of the image areas 550A-D may be an arrangement of the image areas 550A-D that minimizes the loss function.

To determine the loss function of the image areas 550A-D in a given layout, the optimizer 222 may use the following equation:

$$\text{Loss Function} = W_O \times O + W_S \times S$$

where, $W_O$ is an overlap parameter,

O is an overlap loss, $W_S$ is a spreading parameter, and

S is a spreading loss.

As noted above, parameters, such as the overlap parameter, $W_O$, and the spreading parameter, $W_S$, may constrain the arrangements generated by the layout generator 220. In some embodiments, these parameters may be weights within the loss function equation, thereby influencing the impact of a respective loss (e.g., overlap loss or spreading loss) on the overall loss function.

As shown, the optimizer 222 may include a spreading loss module 226 and an overlap loss module 224. The spreading loss module 226 may determine or measure a spreading loss, S, of image areas 550A-D in a respective layout. And the overlap loss module 224 may determine or measure the overlap loss, O, of the image areas 550A-D in a respective layout. For example, with reference to the layout 600A, the spreading loss module 226 may determine the spreading loss for the image areas 550A-D in the layout 600A and the overlap loss module 224 may determine the overlap loss, O, for the image areas 550A-D in the layout 600A.

To determine the spreading loss, S, for the layout 600A, the spreading loss module 226 may measure a sum of distance between each center point 552A-D and a centroid 656 of the image areas 550A-D. The spreading loss, S, may indicate how far apart the image areas 550A-D are from each other within the canvas 654. For example, minimizing the spreading loss may reduce the distance between the image areas 550A-D. The centroid 656 may be determined or computed as an average point of the image areas 550A-D combined. For example, the centroid 656 may be determined in terms of x, y coordinates within the canvas 654, such as (Cx, Cy). In such cases, the following formula may be used to determine the centroid 656:

$$Cx = \frac{\sum (A_i \cdot Cx_i)}{\sum A_i}$$

$$Cy = \frac{\sum (A_i \cdot Cy_i)}{\sum A_i}$$

where $A_i$ is the area of each image area 550A-D, and $Cx_i$ and $Cy_i$ are the coordinates of the center points 552A-D for each respective image area.

To measure the overlap loss, O, for the layout 600A, the overlap loss module 226 may measure an overlap area for the image areas 550A-D. That is, the overlap area may be the sum overlap area in which a pair of image areas 550A-D overlap. As shown, however, in the layout 600A, since none of the image areas 550A-D overlap, the overlap loss, O, may be determined to be zero. Since the overlap loss for the layout 600A is zero, then the spreading loss may be a determining parameter. As such, a more compact grid layout, such as illustrated by the layout 600A may be formed. A similar type of layout may be generated by increasing the spreading parameter, $W_S$, while minimizing the overlap parameter, $W_O$.

Once the loss function of the layout 600A is determined, the photospread engine 210 may iterate to another arrangement of the image areas 550A-D. For example, the layout generator 220 may generate another layout, such as the layout 600B illustrated in FIG. 6B. As shown, the image areas 550A-D may be in a different arrangement in the layout 600B than in the layout 600A. For the layout 600B, the optimizer 222 may determine a loss function. That is, the spreading loss module 226 may determine a spreading loss, S, for the image areas 550A-D in the layout 600B by determine a distance sum between the center points 552A-D and the centroid 656 of the image areas 550A-D.

Additionally, the overlap loss module 224 may determine an overlap loss, O, for the image areas 550A-D in the layout 600B. Unlike the layout 600A, the image areas 550A-D in the layout 600B overlap. As shown, a portion of the image area 550B overlaps a portion of the image area 550B to form a first overlap area 658A. Similarly, a portion of the image area 550A overlaps a portion of the image area 550D to form a second overlap area 658B. As such, to determine the overlap loss, O, for the layout 600B, the overlap loss module 224 may determine the first overlap area 658A, determine the area of the second overlap area 658B, and determine a total overlap area. The total overlap area may include the first overlap area 658A and the second overlap area 658B.

As shown, the image areas 550A-D in the layout 600B include rotation about a respective center point 552A-D. This rotation may be based on a rotation parameter set for a given photospread. If the rotation parameter is set to zero, and thus no rotation is allowed, then a layout like the layout 600A in which the image areas 550A-D lack rotation may be generated. However, if rotation is allowed, then a layout, such as the layout 600B may be generated in which one or more of the image areas 550A-D include rotation. As can be appreciated, increasing the rotation parameter may increase the degree to which the layout generator 220 may generate layouts in which the image areas 550A-D are rotated. As increasing the rotation parameter may increase the likelihood of the image areas 550A-D to overlap, the rotation parameter may be accounted for within the loss function formula as part of the overlap loss, O.

Figure 6C:
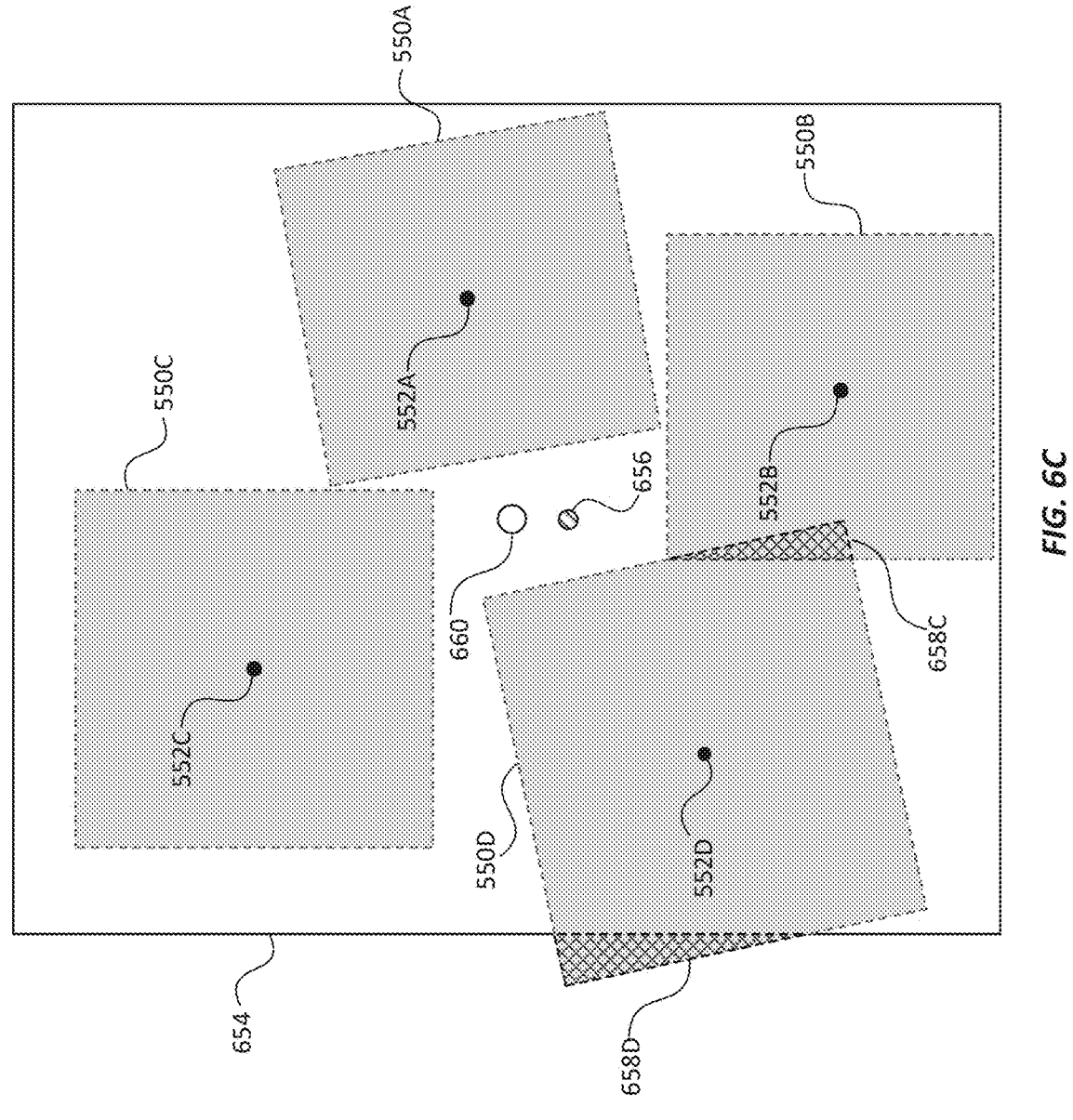

Referring now to FIG. 6C, another layout 600C including the image areas 550A-D is illustrated, according to an embodiment herein. The layout 600C may be generated by the layout generator 220 as another iteration of the arrangement of the image areas 550A-D. As shown, the image areas 550A-D may be in a different arrangement than the layouts 600A and 600B. For the layout 600C, the optimizer 222 may determine a loss function of the image areas 550A-D. For example, the overlap loss module 224 may determine the overlap loss of the image areas 550A-D based on a first overlap area 658C formed between the pair of image areas 550B and 550D. The overlap loss module 224 may also determine the overlap loss based on an overlap area 658D formed by the image area 550D extending beyond the boundary of the canvas 654. In some embodiments, overlap of an image area beyond the boundary of the canvas 654 may be restricted, while in other embodiments it may be allowed. If the boundary overlap is allowed, then the overlap loss module 224 may account for such an overlap as the overlap area 658D. Additionally, the spreading loss module 226 may determine the spreading loss of the image areas 550A-D as arranged in the layout 600C.

As noted above, the generation of the layout may be an iterative process. As such, the photospread engine 550 may iteratively generate layouts and compute loss functions for each respective layout. The photospread engine 550 may generate layouts until a layout that minimizes the loss function is minimized. As can be appreciated, there may be an infinite number of layouts in which the loss function is minimized. As such, the photospread engine 550 may be bounded by an iteration threshold 228. In particular, the optimizer 222 may be bounded by the iteration threshold 228. In some embodiments, the iteration threshold 228 may be a set iteration duration, which may be measured as a time duration (e.g., 30 seconds) for determining the loss function minima or as a number of iterations (e.g., 1500) that may be performed to determine the loss function minima.

Figure 6D:

Once a loss function minima is determined, and thus a final layout is identified, the photospread engine 210 may perform one or more finalizing steps on the layout. Following the above example, the photospread engine 210 may determine the layout 600C as the layout that minimizes the loss function. As such, the layout 600C may be identified for the final layout. To finalize the layout 600C, the photospread engine 210 may center the layout 600C on the canvas 654. As shown, a center 660 of the canvas 654 may be off from the centroid 656 of the image areas 550A-D. As such, the photospread engine 210 may align the centroid 656 with the center 660 of the canvas. FIG. 6D illustrates a layout 600D in which the center 660 of the canvas 654 is aligned with the centroid 656 of the image areas 550A-D, according to an embodiment herein. As can be appreciated, the photospread engine 210 may center the layout 600C on the canvas 654 in other manners.

Figure 6E:
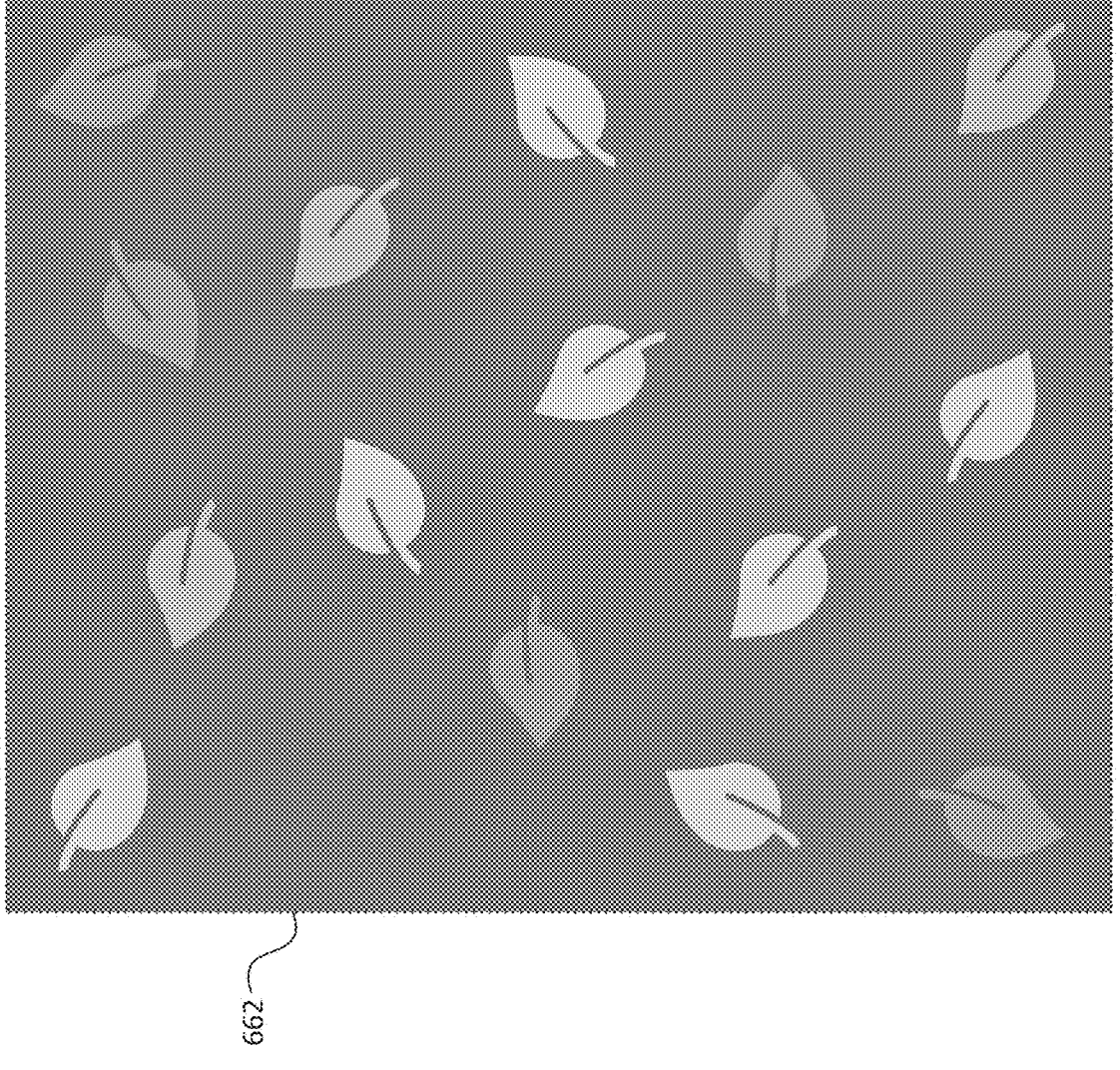

In some embodiments, the photospread engine 210 may generate a background for the photospread. FIG. 6E illustrates an example background 662 that may be generated by the photospread engine 210 for a photospread including the images 450A-D, according to an embodiment herein. By adding the background 662 to a photospread, the photospread engine 210 can provide context to the images 450A-D by setting a scene or theme that ties the images 450A-D together. For example, as shown the images 450A-D depict birds. As such, the background 662 may relate to the theme of bird, such as including leaves or other foliage. The background 662 may also enhance the artistic aesthetic by creating a visually cohesive and appealing backdrop that complements and highlights the individual images 450A-D.

In some embodiments, the photospread engine 210 may interact with a content generator 206, which may be the same or similar to the content generator 106, to generate the background 662. In such embodiments, the photospread engine 210 may include a prompt generator 218 that generates a prompt to submit to the content generator 206 for creating the background 662. The prompt generator 218 may determine context based on the images 450A-D from which the background 662 should be based. For example, the prompt generator 218 may determine context from the request 214, which may include language such as "generate a photospread of my bird-watching adventure." From the request 214 the prompt generator 218 may determine the context of "bird-watching" and generate a prompt 230 based on this context. In other embodiments, the photospread engine 210 may determine content from the images 450A-D themselves. For example, the photospread engine 210 may process the images 450A-D and determine that they each relate to birds. Based on this determination, the prompt generator 218 may generate the prompt 230 to contain the context of birds. For example, the prompt 230 may request that the content generator 206 generate a background for a photospread of birds. Responsive to the prompt 230, the content generator 206 may provide background 262, which may be the same or similar to the background 662.

It should be noted that while the content generator 206 is illustrated as separate from the photospread engine 210, in some embodiments, the photospread engine 210 may include the content generator 206.

Figure 6F:
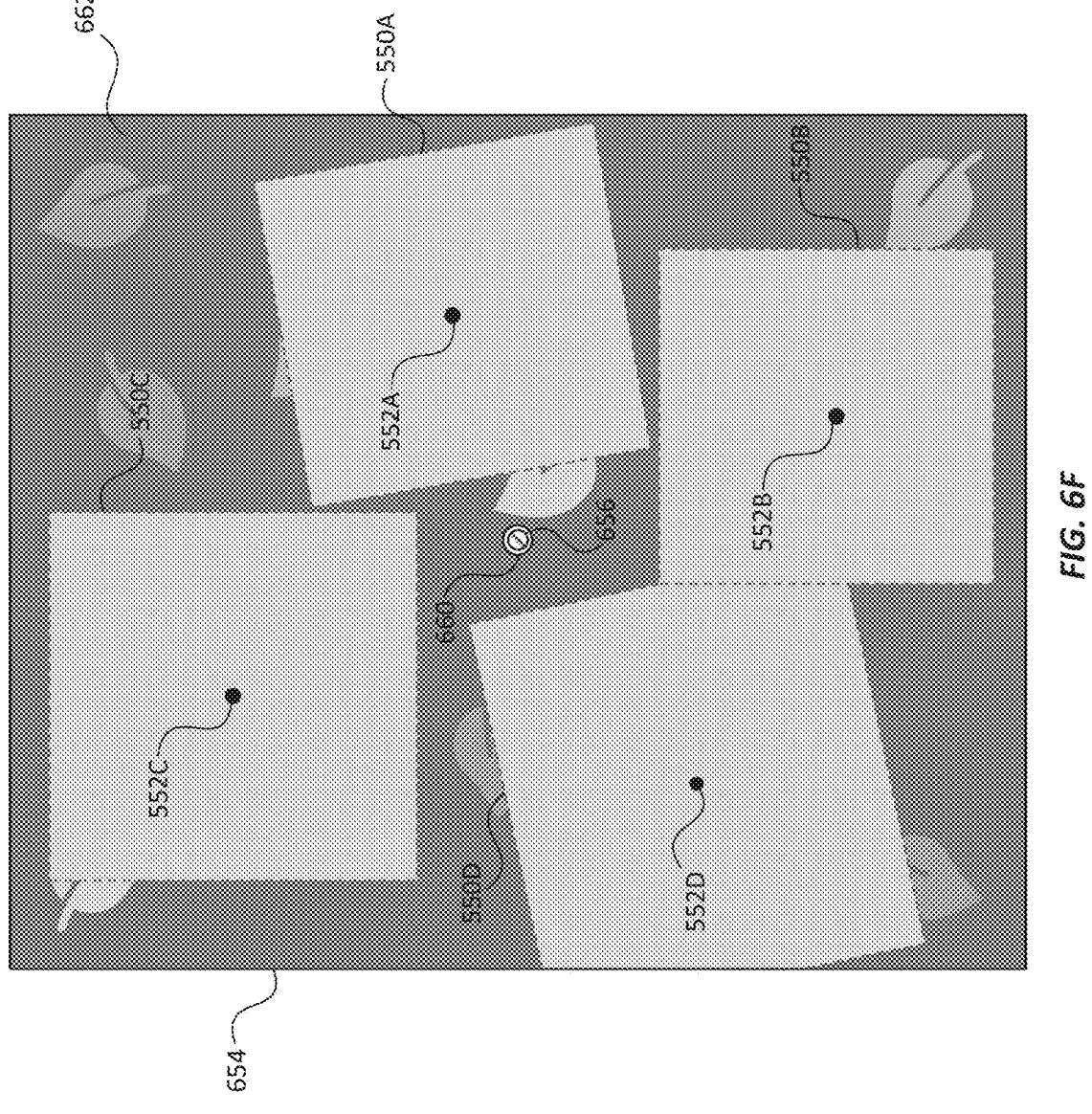

Once the photospread engine 210 receives the background 262 from the content generator 206, the photospread engine 210 may generate a final layout. The final layout may be the layout from which the photospread is generated. In some embodiments, the photospread engine 210 may include a photospread generator 234 that generates the final layout and/or the photospread. Referring now to FIG. 6F, a final layout 600F is illustrated according to an embodiment herein. As shown, the final layout 600F may be the layout determined to have the loss function minima, centered on the canvas 654, and having the background 662 applied to or overlaid on the canvas 654.

Figure 7:
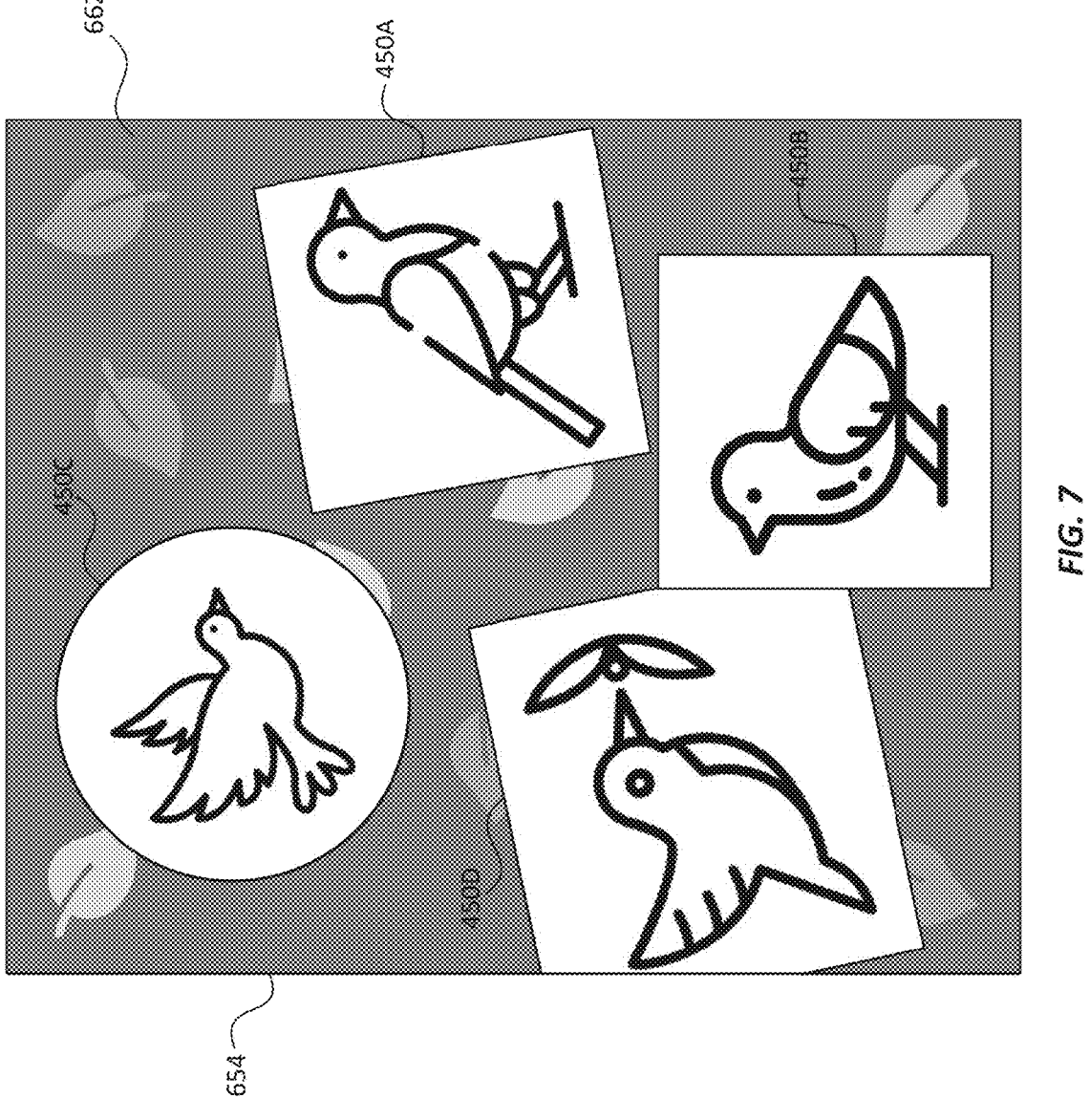
FIG. 7 illustrates an example photospread generated based on the images of FIG. 4, according to an embodiment herein.

The photospread engine 210 may generate a photospread 212 including the images 450A-D on the canvas 654 (348). In some embodiments, the photospread engine 210 may generate the photospread 212 based on the final layout 600E of the image areas 550A-D. For example, to generate the photospread 212 based on the images 450A-D, the photospread generator 234 may insert the images 450A-D into the image areas 550A-D within the final layout 600F. Referring now to FIG. 7, a photospread 712 including the images 450A-D is illustrated, according to an embodiment herein. As shown, the images 450A-D are inserted in place of a respective image area 550A-D within the final layout 600F. The photospread 712 may be the same or similar to the photospread 212.

Once generated, the photospread engine 210 may transmit the photospread 212 to the client device 202. Upon receipt of the photospread 212, the client device 202 may interact with the photospread 212, such as by viewing or sharing amongst colleagues or friends. In some embodiments, the client device 202 may request changes or tweaks to the photospread 212, such as increasing an image size or rotation within the photospread 212.

Figure 8:
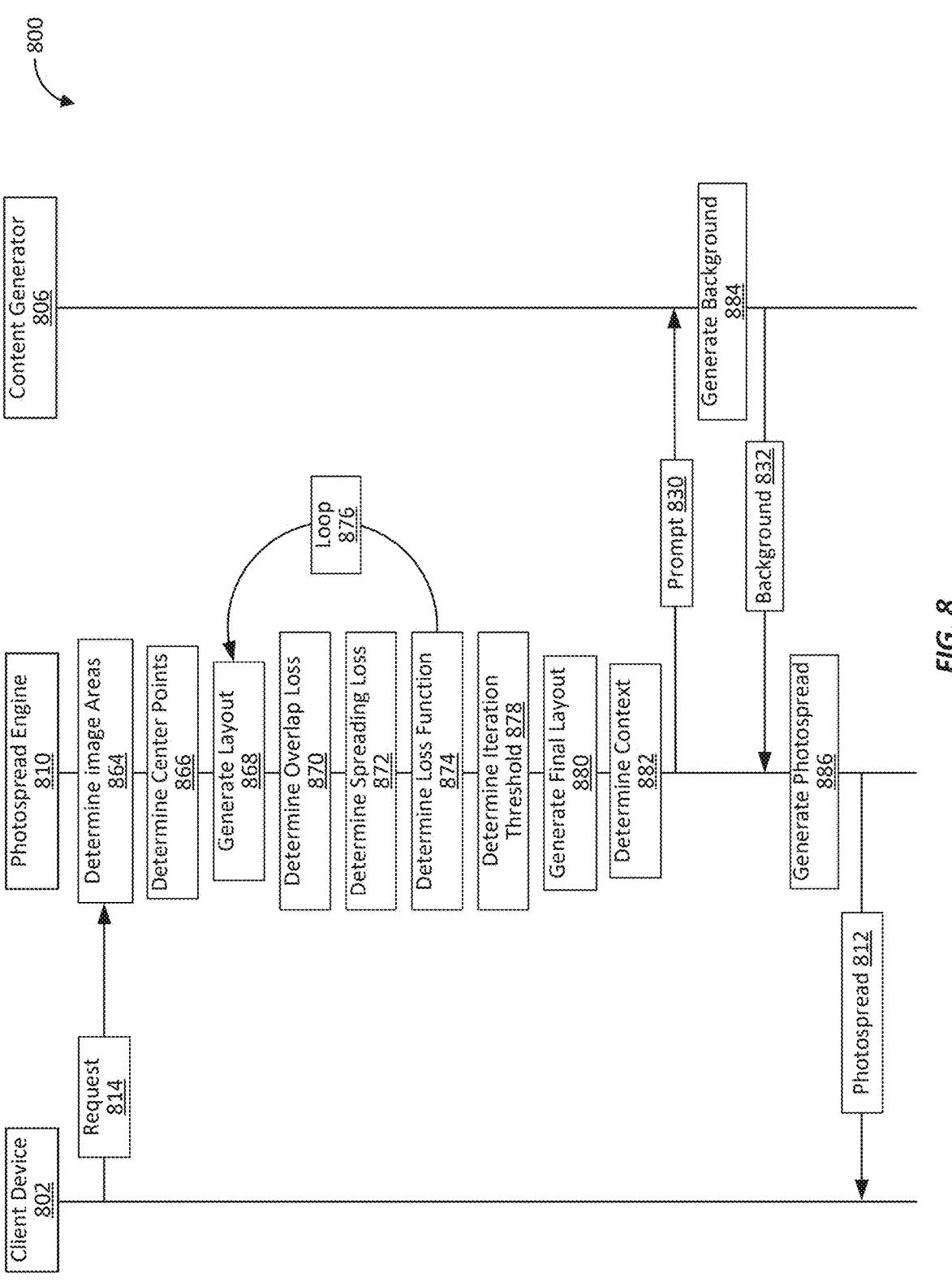
FIG. 8 illustrates an example photospread flow for generating a photospread via the photospread engine, according to an embodiment herein.

Turning now to FIG. 8, a photospread flow 800 or a flow 800 for generating a photospread via a photospread engine is provided, according to an embodiment herein. As shown, the flow 800 may begin with a client device 802, which may be the same or similar to the client device 202, submitting a request 814 to a photospread engine 810, which may be the same or similar to the photospread engine 210. As described above, the request 814 may be a request for a photospread based on one or more images. Responsive to receiving the request 814, the photospread engine 810 may determine image areas (864), such as the image areas 550A-D, for each of the images identified in the request 814. Once the image areas are determined, the photospread engine 810 may determine a center point, such as the center points 552A-D, for each of the image areas 550A-D (866).

Based on the image areas, the photospread engine 810 may generate an initial layout of the image areas (868). For example, a layout generator, such as the layout generator 220 may generate a layout of the image areas. Based on the layout, the photospread engine may determine an overlap loss of the image areas (870) and/or a spreading loss of the image areas (872). For an example an overlap loss module, such as the overlap loss module 224, may determine the overlap loss of the image areas, and a spreading loss module, such as the spreading loss module 226, may determine the spreading loss of the image areas. From the overlap loss and the spreading loss, the photospread engine 810 may determine a loss function for the layout. In some embodiments, an optimizer 222 may determine the loss function for the layout.

As described above, the photospread process may be an iterative process and as such the photospread engine 810 may loop (876) to generating another layout once the loss function is determined. On each loop, the photospread engine 810 may generate a new layout of the image areas in a different arrangement based on the parameters. Then for each new layout the photospread engine 810 may determine a loss function (874) based on the overlap loss (870) and/or the spreading loss (872). The photospread engine 810 may iterate until the loss function is optimized or minimized. As noted above, optimization of the loss function may be bounded by an iteration threshold. As such, the photospread engine may iterate via the loop 876 until an iteration threshold is determined (878).

Once the iteration threshold is determined (878), the photospread engine 810 may determine which of the layouts generated during the iteration process generated a loss function minima. Based on this, the photospread engine 810 may generate a final layout (880). As described above, this may include centering the layout having the loss function minima on a respective canvas. In some embodiments, generation of the final layout (880) may include generating a background for the photospread. In such cases, the photospread engine 810 may determine a context of the photospread (882), such as by determining context from the request 814 and/or the images.

From the context, the photospread engine 810 may generate and transmit a prompt 830 to a content generator 806, which may be the same or similar to the content generators 106 or 206. Responsive to receiving the prompt 830, the content generator 806 may generate a background (884) and transmit the background (832) to the photospread engine 810. When the photospread engine 810 receives the background, the photospread engine 810 may generate the photospread including the background (886). Once generated, the photospread engine 810 may transmit the photospread (812) to the client device for its display and viewing of the photospread.

Referring to FIG. 9, FIG. 9 illustrates a computing apparatus 991 that may be used for providing a photospread engine and related functions, as described herein. For example, the client device 102 or 202 may be or include the computing apparatus 991. As illustrated, the computing apparatus 991 includes a processing system 992 that includes a microprocessor and other circuitry that retrieves and executes software 995 from storage system 993. The processing system 992 may be implemented within a single processing device but may also be distributed across multiple processing devices or sub-systems that cooperate in executing program instructions. Examples of the processing system 992 include general purpose central processing units, graphical processing units, application specific processors, and logic devices, as well as any other type of processing device, combinations, or variations thereof.

The storage system 993 may comprise any computer-readable storage media or medium readable by processing system 992 and capable of storing software 995. The storage system 993 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations the storage system 993 may also include computer readable communication media over which at least some of the software 995 may be communicated internally or externally. The storage system 993 may be implemented as a single storage device but may also be implemented across multiple storage devices or sub-systems co-located or distributed relative to each other. The storage system 993 may comprise additional elements, such as a controller capable of communicating with the processing system 992 or possibly other systems.

The software 995 (including photospread engine process 696) may be implemented in program instructions and among other functions may, when executed by the processing system 992, direct the processing system 992 to operate as described with respect to the various operational scenarios, sequences, and processes illustrated herein. For example, the software 995 may include program instructions for implementing a photospread engine and related functions, such as the process 300 or the flow 800, as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. The software 995 may include additional processes, programs, or components, such as operating system software, virtualization software, or other application software. The software 995 may also comprise firmware or some other form of machine-readable processing instructions executable by the processing system 992.

In general, the software 995 may, when loaded into the processing system 992 and executed, transform a suitable apparatus, system, or device (of which computing apparatus 991 is representative) overall from a general-purpose computing system into a special-purpose computing system customized to generate features, functionality, and user experiences provided by the photospread engine. Indeed, encoding the software 995 on the storage system 993 may transform the physical structure of the storage system 993. The specific transformation of the physical structure may depend on various factors in different implementations of this description. Examples of such factors may include, but are not limited to, the technology used to implement the storage media of the storage system 993 and whether the computer-storage media are characterized as primary or secondary storage, as well as other factors.

For example, if the computer readable storage media are implemented as semiconductor-based memory, the software 995 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 697 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between the computing apparatus 991 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Examples are described herein in the context of systems and methods for providing a photospread engine and related functions. Those of ordinary skill in the art will realize that the foregoing description is illustrative only and is not intended to be in any way limiting. Reference is made in detail to implementations of examples as illustrated in the accompanying drawings. The same reference indicators will be used throughout the drawings and the following description to refer to the same or like items.

Additionally, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure. In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a computing apparatus comprising: a computer-readable storage medium; a photospread engine comprising processor-executable instructions stored on the computer-readable storage medium; and one or more processors coupled to the computer-readable storage medium and configured to execute the processor-executable instructions, wherein the processor-executable instructions, when executed by the one or more processors, direct the computing apparatus, to at least: identify a plurality of images; determine a plurality of image areas based on the plurality of images, wherein each image area of the plurality of image areas corresponds to a respective image of the plurality of images; determine a center point for each image area of the plurality of image areas; determine a loss function for the plurality of image areas, wherein the loss function comprises: an overlap loss for an overlap area between the plurality of image areas; and a spreading loss for a distance sum between the center point of each image area and a centroid of the plurality of image areas; and generate a photospread on a canvas, wherein: the photospread comprises the plurality of images; and the photospread is based on optimizing the loss function for the plurality of image areas.

Example 2 is the computing apparatus of any previous or subsequent Example, wherein the processor-executable instructions to determine the loss function for the plurality of image areas, when executed by the one or more processors, further direct the computing apparatus to: iteratively reposition each of the image areas on the canvas until the loss function is minimized, wherein the plurality of image areas is repositioned for a set iteration duration.

Example 3 is the computing apparatus of any previous or subsequent Example, wherein the processor-executable instructions to generate the photospread on the canvas, when executed by the one or more processors, further direct the computing apparatus to: generate a layout comprising the plurality of image areas positioned on the canvas; center point the layout within the canvas; and generate the photospread of the plurality of images based on the layout.

Example 4 is the computing apparatus of any previous or subsequent Example, wherein the processor-executable instructions to determine the loss function for the plurality of image areas, when executed by the one or more processors, further direct the computing apparatus to: approximate one or more of the image areas as a bounding box; determine a pair overlap area between each pair of image areas, wherein at least one pair overlap area is based on the bounding box; determine a sum overlap area comprising a summation of the pair overlap areas between each pair of image areas; and determine the overlap loss based on the sum overlap area.

Example 5 is the computing apparatus of any previous or subsequent Example, wherein the processor-executable instructions to determine the loss function for the plurality of image areas, when executed by the one or more processors, further direct the computing apparatus to: iteratively determine the centroid of the plurality of image areas as one or more of the image areas are repositioned; and iteratively determine the distance sum between the center point of each image area and the centroid of the plurality of image areas as the one or more of the image areas are repositioned.

Example 6 is the computing apparatus of any previous or subsequent Example, wherein the processor-executable instructions to determine the loss function for the plurality of image areas, when executed by the one or more processors, further direct the computing apparatus to: determine a rotation for each image area of the plurality of image areas; and minimize the loss function for the plurality of image areas based on the overlap loss of the plurality of image areas, the spreading loss of the plurality of image areas, and the rotation for each image area of the plurality of image areas.

Example 7 is a method comprising: identifying, by a photospread engine, a plurality of images; determining, by the photospread engine, a plurality of image areas based on the plurality of images, wherein each image area of the plurality of image areas corresponds to a respective image of the plurality of images; determining, by the photospread engine, a center point for each image area of the plurality of image areas; minimizing, by the photospread engine, a loss function for the plurality of image areas, wherein the loss function comprises: an overlap loss for an overlap area between the plurality of image areas; and a spreading loss for a distance sum between the center point of each image area and a centroid of the plurality of image areas; and generating, by the photospread engine, a photospread comprising the plurality of images on a canvas, wherein the photospread is based on optimizing the loss function for the plurality of image areas.

Example 8 is the method of any previous or subsequent Example, wherein the method further comprises: determining, by the photospread engine, dimensions of the canvas; and scaling, by the photospread engine, dimensions of each image area based on the dimensions of the canvas, wherein scaling of the dimensions for each image area preserves an Example ratio associated with each respective image.

Example 9 is the method of any previous or subsequent Example, wherein minimizing, by the photospread engine, the loss function for the plurality of image areas comprises: generating, by the photospread engine, a random position for each image area of the plurality of image areas on the canvas; determining, by the photospread engine, coordinates for the center point of each image area of in the random position; and iteratively changing, by the photospread engine, positions of one or more of the image areas on the canvas to minimize the loss function.

Example 10 is the method of any previous or subsequent Example, wherein the method further comprises: determining, by the photospread engine, the overlap loss for the overlap area between the plurality of image areas, wherein determining the overlap loss comprises: determining, by the photospread engine, a pair overlap area between each pair of image areas; and determining, by the photospread engine, a sum overlap area comprising a summation of the pair overlap areas between each pair of image areas.

Example 11 is the method of any previous or subsequent Example, wherein the method further comprises determining, by the photospread engine, the spreading loss of the plurality of image areas, wherein determining the spreading loss of the plurality of image areas comprises: determining, by the photospread engine, the centroid of the plurality of image areas; and determining, by the photospread engine, a distance between the center point of each image area and the centroid of the plurality of image areas.

Example 12 is the method of any previous or subsequent Example, wherein determining, by the photospread engine, the plurality of image areas based on the plurality of images comprises: determining, by the photospread engine, dimensions for each of the plurality of images, wherein determining the dimensions for each of the plurality of images comprises approximating, by the photospread engine, the dimensions of one or more of the plurality of images using bounding boxes; and determining, by the photospread engine, the plurality of image areas based on the dimensions of each of the plurality of images.

Example 13 is the method of any previous or subsequent Example, wherein the method further comprises: determining, by the photospread engine, a rotation for each image area of the plurality of image areas; and minimizing, by the photospread engine, the loss function for the plurality of image areas based on the overlap loss of the plurality of image areas, the spreading loss of the plurality of image areas, and the rotation for each image area of the plurality of image areas.

Example 14 is the method of any previous or subsequent Example, wherein the method further comprises: generating, by the photospread engine, a layout based on minimizing the loss function, wherein the layout comprises positions for each image area of the plurality of image areas on the canvas; and generating, by the photospread engine, the photospread of the plurality of images comprises inserting, by the photospread engine, each image of the plurality of images into a respective image area within the layout to generate the photospread.

Example 15 is a computer readable storage media comprising processor-executable instructions configured to cause one or more processors to: receive, from a client device, a plurality of images; determine, by a photospread engine, a plurality of image areas based on the plurality of images, wherein each image area of the plurality of image areas corresponds to a respective image of the plurality of images; determine, by the photospread engine, a center point for each image area of the plurality of image areas; optimize, by the photospread engine, a loss function for the plurality of image areas, wherein the loss function comprises an overlap loss for an overlap area between the plurality of image areas; and a spreading loss for a distance sum between the center point of each image area and a centroid of the plurality of image areas; and generate, by the photospread engine, a photospread comprising the plurality of images on a canvas based on optimization of the loss function for the plurality of image areas.

Example 16 is the computer readable storage media of any previous or subsequent Example, wherein the processor-executable instructions to generate the photospread comprising the plurality of images on the canvas cause the one or more processors to further execute processor-executable instructions stored in the computer readable storage media to: generate, by the photospread engine, a layout of the plurality of image areas on the canvas; receive, from a content generator, a background for the canvas; overlay, by the photospread engine, the layout of the plurality of image areas on the background; and insert, by the photospread engine, each image of the plurality of images into a respective image area within the layout to generate the photospread comprising the background.

Example 17 is the computer readable storage media of any previous or subsequent Example, wherein the processor-executable instructions to determine, by the photospread engine, the plurality of image areas based on the plurality of images cause the one or more processors to further execute processor-executable instructions stored in the computer readable storage media to: approximate, by the photospread engine, dimensions for each of the plurality of images, using bounding boxes; and determine, by the photospread engine, the plurality of image areas based on the dimensions of each of the plurality of images.

Example 18 is the computer readable storage media of any previous or subsequent Example, wherein the processor-executable instructions to optimize, by the photospread engine, the loss function for the plurality of image areas cause the one or more processors to further execute processor-executable instructions stored in the computer readable storage media to: determine a rotation for each image area of the plurality of image areas; and minimize the loss function for the plurality of image areas based on the overlap loss of the plurality of image areas, the spreading loss of the plurality of image areas, and the rotation for each image area of the plurality of image areas.

Example 19 is the computer readable storage media of any previous or subsequent Example, wherein the processor-executable instructions to optimize, by the photospread engine, the loss function for the plurality of image areas cause the one or more processors to further execute processor-executable instructions stored in the computer readable storage media to: iteratively reposition each of the image areas on the canvas until the loss function is minimized, wherein the plurality of image areas is repositioned for a set iteration duration.

Example 20 is the computer readable storage media of any previous or subsequent Example, wherein the processor-executable instructions cause the one or more processors to further execute processor-executable instructions stored in the computer readable storage media to: determine, by the photospread engine, dimensions of the canvas; determine, by the photospread engine, dimensions of each image of the plurality of images; and scale, by the photospread engine, the dimensions of each image area based on the dimensions of the canvas, wherein scaling of the dimensions for each image area preserves an Example ratio associated with each respective image.

What is claimed is:

1. A computing apparatus comprising:

a computer-readable storage medium;

a photospread engine comprising processor-executable instructions stored on the computer-readable storage medium; and one or more processors coupled to the computer-readable storage medium and configured to execute the processor-executable instructions, wherein the processor-executable instructions, when executed by the one or more processors, direct the computing apparatus, to at least:

identify a plurality of images; determine a plurality of image areas based on the plurality of images, wherein each image area of the plurality of image areas corresponds to a respective image of the plurality of images;

determine a center point for each image area of the plurality of image areas; determine a loss function for the plurality of image areas, wherein the loss function comprises:

an overlap loss associated with an overlap area between the plurality of image areas; and a spreading loss associated with a distance sum between the center point of each image area and a centroid of the plurality of image areas; and generate a photospread on a canvas, wherein: the photospread comprises the plurality of images; and the photospread is based on optimizing the loss function for the plurality of image areas.

2. The computing apparatus of claim 1, wherein the processor-executable instructions to determine the loss function for the plurality of image areas, when executed by the one or more processors, further direct the computing apparatus to:

iteratively reposition each of the image areas on the canvas until the loss function is minimized, wherein the plurality of image areas is repositioned for a set iteration duration.

3. The computing apparatus of claim 1, wherein the processor-executable instructions to generate the photospread on the canvas, when executed by the one or more processors, further direct the computing apparatus to: generate a layout comprising the plurality of image areas positioned on the canvas; center point the layout within the canvas; and generate the photospread of the plurality of images based on the layout.

4. The computing apparatus of claim 1, wherein the processor-executable instructions to determine the loss function for the plurality of image areas, when executed by the one or more processors, further direct the computing apparatus to:

approximate one or more of the image areas as a bounding box; determine a pair overlap area between each pair of image areas, wherein at least one pair overlap area is based on the bounding box; determine a sum overlap area comprising a summation of the pair overlap areas between each pair of image areas; and determine the overlap loss based on the sum overlap area.

5. The computing apparatus of claim 1, wherein the processor-executable instructions to determine the loss function for the plurality of image areas, when executed by the one or more processors, further direct the computing apparatus to:

iteratively determine the centroid of the plurality of image areas as one or more of the image areas are repositioned; and iteratively determine the distance sum between the center point of each image area and the centroid of the plurality of image areas as the one or more of the image areas are repositioned.

6. The computing apparatus of claim 1, wherein the processor-executable instructions to determine the loss function for the plurality of image areas, when executed by the one or more processors, further direct the computing apparatus to:

determine a rotation for each image area of the plurality of image areas; and minimize the loss function for the plurality of image areas based on the overlap loss of the plurality of image areas, the spreading loss of the plurality of image areas, and the rotation for each image area of the plurality of image areas.

7. A method comprising:

identifying, by a photospread engine, a plurality of images;

determining, by the photospread engine, a plurality of image areas based on the plurality of images, wherein each image area of the plurality of image areas corresponds to a respective image of the plurality of images;

determining, by the photospread engine, a center point for each image area of the plurality of image areas;

minimizing, by the photospread engine, a loss function for the plurality of image areas, wherein the loss function comprises: an overlap loss associated with an overlap area between the plurality of image areas; and a spreading loss associated with a distance sum between the center point of each image area and a centroid of the plurality of image areas; and generating, by the photospread engine, a photospread comprising the plurality of images on a canvas, wherein the photospread is based on optimizing the loss function for the plurality of image areas.

8. The method of claim 7, wherein the method further comprises: determining, by the photospread engine, dimensions of the canvas; and scaling, by the photospread engine, dimensions of each image area based on the dimensions of the canvas, wherein scaling of the dimensions for each image area preserves an aspect ratio associated with each respective image.

9. The method of claim 7, wherein minimizing, by the photospread engine, the loss function for the plurality of image areas comprises: generating, by the photospread engine, a random position for each image area of the plurality of image areas on the canvas; determining, by the photospread engine, coordinates for the center point of each image area of in the random position; and iteratively changing, by the photospread engine, positions of one or more of the image areas on the canvas to minimize the loss function.

10. The method of claim 7, wherein the method further comprises:

determining, by the photospread engine, the overlap loss for the overlap area between the plurality of image areas, wherein determining the overlap loss comprises:

determining, by the photospread engine, a pair overlap area between each pair of image areas; and determining, by the photospread engine, a sum overlap area comprising a summation of the pair overlap areas between each pair of image areas.

11. The method of claim 7, wherein the method further comprises determining, by the photospread engine, the spreading loss of the plurality of image areas, wherein determining the spreading loss of the plurality of image areas comprises: determining, by the photospread engine, the centroid of the plurality of image areas; and determining, by the photospread engine, a distance between the center point of each image area and the centroid of the plurality of image areas.

12. The method of claim 7, wherein determining, by the photospread engine, the plurality of image areas based on the plurality of images comprises: determining, by the photospread engine, dimensions for each of the plurality of images, wherein determining the dimensions for each of the plurality of images comprises approximating, by the photospread engine, the dimensions of one or more of the plurality of images using bounding boxes; and determining, by the photospread engine, the plurality of image areas based on the dimensions of each of the plurality of images.

13. The method of claim 7, wherein the method further comprises:

determining, by the photospread engine, a rotation for each image area of the plurality of image areas; and minimizing, by the photospread engine, the loss function for the plurality of image areas based on the overlap loss of the plurality of image areas, the spreading loss of the plurality of image areas, and the rotation for each image area of the plurality of image areas.

14. The method of claim 7, wherein the method further comprises: generating, by the photospread engine, a layout based on minimizing the loss function, wherein the layout comprises positions for each image area of the plurality of image areas on the canvas; and generating, by the photospread engine, the photospread of the plurality of images comprises inserting, by the photospread engine, each image of the plurality of images into a respective image area within the layout to generate the photospread.

15. A non-transitory computer readable storage media comprising processor-executable instructions configured to cause one or more processors to:

receive, from a client device, a plurality of images;

determine, by a photospread engine, a plurality of image areas based on the plurality of images, wherein each image area of the plurality of image areas corresponds to a respective image of the plurality of images;

determine, by the photospread engine, a center point for each image area of the plurality of image areas; optimize, by the photospread engine, a loss function for the plurality of image areas, wherein the loss function comprises;

an overlap loss associated with an overlap area between the plurality of image areas; and a spreading loss associated with a distance sum between the center point of each image area and a centroid of the plurality of image areas; and generate, by the photospread engine, a photospread comprising the plurality of images on a canvas based on optimization of the loss function for the plurality of image areas.

16. The computer readable storage media of claim 15, wherein the processor-executable instructions to generate the photospread comprising the plurality of images on the canvas cause the one or more processors to further execute processor-executable instructions stored in the computer readable storage media to: generate, by the photospread engine, a layout of the plurality of image areas on the canvas; receive, from a content generator, a background for the canvas; overlay, by the photospread engine, the layout of the plurality of image areas on the background; and insert, by the photospread engine, each image of the plurality of images into a respective image area within the layout to generate the photospread comprising the background.

17. The computer readable storage media of claim 15, wherein the processor-executable instructions to determine, by the photospread engine, the plurality of image areas based on the plurality of images cause the one or more processors to further execute processor-executable instructions stored in the computer readable storage media to: approximate, by the photospread engine, dimensions for each of the plurality of images, using bounding boxes; and determine, by the photospread engine, the plurality of image areas based on the dimensions of each of the plurality of images.

18. The computer readable storage media of claim 15, wherein the processor-executable instructions to optimize, by the photospread engine, the loss function for the plurality of image areas cause the one or more processors to further execute processor-executable instructions stored in the computer readable storage media to: determine a rotation for each image area of the plurality of image areas; and minimize the loss function for the plurality of image areas based on the overlap loss of the plurality of image areas, the spreading loss of the plurality of image areas, and the rotation for each image area of the plurality of image areas.

19. The computer readable storage media of claim 15, wherein the processor-executable instructions to optimize, by the photospread engine, the loss function for the plurality of image areas cause the one or more processors to further execute processor-executable instructions stored in the computer readable storage media to: iteratively reposition each of the image areas on the canvas until the loss function is minimized, wherein the plurality of image areas is repositioned for a set iteration duration.

20. The computer readable storage media of claim 15, wherein the processor-executable instructions cause the one or more processors to further execute processor-executable instructions stored in the computer readable storage media to: determine, by the photospread engine, dimensions of the canvas; determine, by the photospread engine, dimensions of each image of the plurality of images; and scale, by the photospread engine, the dimensions of each image area based on the dimensions of the canvas, wherein scaling of the dimensions for each image area preserves an aspect ratio associated with each respective image.

* * * * *